(12) United States Patent
Petrov et al.

(10) Patent No.: US 12,170,470 B2
(45) Date of Patent: Dec. 17, 2024

(54) STATOR OF AN ELECTRIC MACHINE AND AN ELECTRIC MACHINE

(71) Applicant: LAPPEENRANNAN-LAHDEN TEKNILLINEN YLIOPISTO LUT, Lappeenranta (FI)

(72) Inventors: Ilya Petrov, Lappeenranta (FI); Juha Pyrhönen, Lappeenranta (FI)

(73) Assignee: LAPPEENRANNAN-LAHDEN TEKNILLINEN YLIOPISTO LUT, Lappeenranta (FI)

( * ) Notice: Subject to any disclaimer, the term of this patent is extended or adjusted under 35 U.S.C. 154(b) by 835 days.

(21) Appl. No.: 16/982,938

(22) PCT Filed: Feb. 28, 2019

(86) PCT No.: PCT/FI2019/050162
§ 371 (c)(1),
(2) Date: Sep. 21, 2020

(87) PCT Pub. No.: WO2019/180308
PCT Pub. Date: Sep. 26, 2019

(65) Prior Publication Data
US 2021/0013757 A1    Jan. 14, 2021

(30) Foreign Application Priority Data

Mar. 20, 2018  (FI) .................................... 20185259

(51) Int. Cl.
*H02K 3/24* (2006.01)
*H02K 1/16* (2006.01)
(Continued)

(52) U.S. Cl.
CPC ............... *H02K 3/24* (2013.01); *H02K 1/165* (2013.01); *H02K 1/20* (2013.01); *H02K 3/22* (2013.01); *H02K 9/197* (2013.01); *H02K 9/227* (2021.01)

(58) Field of Classification Search
CPC .......... H02K 9/197; H02K 3/24; H02K 1/165; H02K 3/22; H02K 1/20; H02K 9/227
(Continued)

(56) References Cited

U.S. PATENT DOCUMENTS 3,032,665 A * 5/1962 Wilhelmson ............. H02K 9/00
                                                                   310/57
3,157,806 A    11/1964 Wiedemann
(Continued)

FOREIGN PATENT DOCUMENTS

EP    0 915 554 A2    5/1999
EP    2 806 537       11/2014
(Continued)

OTHER PUBLICATIONS

Office Action issued in Japanese Patent Application No. 2020-551270 dated Apr. 25, 2023.
(Continued)

*Primary Examiner* — Alex W Mok
(74) *Attorney, Agent, or Firm* — NIXON & VANDERHYE

(57) ABSTRACT

A stator of an electric machine comprises a stator core structure (101) and a stator winding comprising a plurality of stator coils (102a-102f) mechanically supported by the stator core structure. Each stator coil comprises electrical conductors and a cooling tube (103) for conducting cooling fluid in the longitudinal direction of the electrical conductors. The stator comprises cooling elements (104a-104c) having heat-conductive mechanical contacts with the stator
(Continued)

core structure. The cooling elements comprise channels for conducting the cooling fluid, and the cooling tubes of the stator coils are connected to each other via the cooling elements. The cooling elements transfer heat caused by iron losses from the stator core structure to the cooling fluid. Furthermore, the cooling elements act as manifolds for conducting the cooling fluid between the cooling tubes of the stator coils.

17 Claims, 6 Drawing Sheets

(51) Int. Cl.
*H02K 1/20* (2006.01)
*H02K 3/22* (2006.01)
*H02K 9/197* (2006.01)
*H02K 9/22* (2006.01)

(58) Field of Classification Search
USPC .......................................................... 310/54
See application file for complete search history.

(56) References Cited

U.S. PATENT DOCUMENTS

| | | | |
|---|---|---|---|
| 4,698,756 A | 10/1987 | Gonzalez et al. | |
| 5,140,204 A * | 8/1992 | Cashmore | H02K 9/225 310/214 |
| 5,189,325 A * | 2/1993 | Jarczynski | H02K 9/197 310/61 |
| 5,886,433 A | 3/1999 | Oda et al. | |
| 6,781,261 B2 * | 8/2004 | Klaar | H02K 3/22 310/58 |
| 6,856,053 B2 * | 2/2005 | LeFlem | H02K 9/197 310/194 |
| 6,933,633 B2 * | 8/2005 | Kaneko | H02K 1/20 310/52 |
| 7,019,429 B1 * | 3/2006 | Larsson | H02K 3/48 310/196 |
| 9,246,373 B2 | 1/2016 | Zirin et al. | |
| 9,698,653 B2 * | 7/2017 | Stiesdal | H02K 1/20 |
| 2004/0213269 A1 | 10/2004 | Furuse | |
| 2006/0145548 A1 | 7/2006 | Wakita | |
| 2009/0261668 A1 | 10/2009 | Mantere | |
| 2010/0054972 A1 | 3/2010 | Li et al. | |
| 2011/0133580 A1 | 6/2011 | Sugimoto et al. | |
| 2011/0221286 A1 * | 9/2011 | Uchiyama | H02K 1/20 310/54 |
| 2011/0221287 A1 * | 9/2011 | Lucchi | H02K 3/24 310/54 |
| 2011/0241459 A1 | 10/2011 | Hashiba | |
| 2011/0304229 A1 * | 12/2011 | Pedersen | H02K 1/20 310/59 |
| 2012/0128512 A1 * | 5/2012 | Vande Sande | F04D 13/06 29/596 |
| 2013/0285487 A1 * | 10/2013 | Pyrhonen | H02K 15/065 310/54 |
| 2014/0300220 A1 * | 10/2014 | Marvin | H02K 3/24 29/596 |
| 2015/0349594 A1 | 12/2015 | Zhang et al. | |
| 2016/0352201 A1 * | 12/2016 | Ranjan | H02K 17/165 |
| 2017/0025927 A1 * | 1/2017 | Weerts | H02K 3/24 |
| 2017/0331344 A1 | 11/2017 | Kang et al. | |

FOREIGN PATENT DOCUMENTS

| | | |
|---|---|---|
| GB | 851409 | 10/1960 |
| GB | 893847 | 4/1962 |
| GB | 2 505 909 | 3/2014 |
| JP | S51-150409 U | 12/1976 |
| JP | S53-061603 U | 5/1978 |
| JP | S60-192639 U | 12/1985 |
| JP | S62-025841 A | 2/1987 |
| JP | H09-140097 A | 5/1997 |
| JP | 2009-240113 | 10/2009 |
| JP | 2010-059969 A | 3/2010 |
| JP | 2010-206977 A | 9/2010 |
| JP | 2011-099442 A | 5/2011 |
| JP | 2011-217580 A | 10/2011 |
| JP | 2012-023837 A | 2/2012 |
| JP | 2013-042588 A | 2/2013 |
| JP | 2015-516138 A | 6/2015 |
| JP | 2015-226465 A | 12/2015 |
| JP | 2017-192163 A | 10/2017 |
| UA | 73 661 C2 | 8/2005 |
| WO | 2013/166372 A1 | 11/2013 |
| WO | 2015/021977 | 2/2015 |
| WO | 2016/189192 | 12/2016 |
| WO | 2017/134850 A1 | 8/2017 |
| WO | 2017/187296 | 11/2017 |

OTHER PUBLICATIONS

Office Action issued in Japanese Patent Application No. 2020-551270 dated Jan. 10, 2023.
International Search Report for PCT/FI2019/050162, mailed May 17, 2019, 4 pages.
Search Report for FI20185259, dated Oct. 15, 2018, 2 pages.
Office Action issued in Korean Patent Application No. 10-2020-7023499 dated Aug. 13, 2023.

* cited by examiner

STATOR OF AN ELECTRIC MACHINE AND AN ELECTRIC MACHINE

This application is the U.S. national phase of International Application No. PCT/FI2019/050162 filed 28 Feb. 2019, which designated the U.S. and claims priority to FI Patent Application No. 20185259 filed 20 Mar. 2018, the entire contents of each of which are hereby incorporated by reference.

FIELD OF THE DISCLOSURE

The disclosure relates generally to cooling of rotating electric machines. More particularly, the disclosure relates to a stator of an electric machine. Furthermore, the disclosure relates to an electric machine.

BACKGROUND

In a rotating electric machine, such as an electric motor or a generator, a magnetic flux is developed between electromagnetically active parts of the rotor and the stator of the electric machine. In a radial flux electric machine, the maximum torque is proportional to the product of the air-gap radius, the area of the air-gap surface, the magnetic flux density in the air-gap, and the linear current density in the air-gap surface of the stator. Hence, without increasing the mechanical size of the electric machine, the maximum torque can be increased by increasing the linear current density because the magnetic flux density cannot be practically increased any more when the saturation point of iron has been exceeded. Increasing the linear current density increases, however, the resistive losses in the windings of the electric machine. On the other hand, the mechanical power of an electric machine can be increased by increasing the rotational speed while keeping the torque unchanged. Thus, electric machines having a high power-to-size ratio are typically high-speed machines. Increasing the rotational speed increases, however, the alternating frequency of magnetic field in a stator core structure and thereby the iron losses, i.e. the hysteresis and especially the eddy current losses, can be significant in high-speed machines. Therefore, the cooling plays a significant role in the operation of rotating electric machines.

An effective method for cooling a stator winding of an electric machine is liquid cooling where cooling liquid is in contact with, or at least in close vicinity of, electrical conductors of the winding. The liquid cooling of a stator winding is traditionally used in conjunction with large turbo-generators in which the electrical conductors of stator coils can be hollow to allow the cooling liquid to flow inside the electrical conductors.

For example, the publication UA73661 discloses a liquid cooled stator of an electric machine. The stator comprises a magnetic core structure with hydrogen cooling and a three-phase winding having hollow bars for the cooling liquid. Hydrogen cooling is typically unsuitable, or at least not cost effective, for electric machines other than large turbo-generators. Therefore, there is a need for technical solutions that are suitable for arranging liquid cooling for a stator winding as well as for a stator core structure.

Publication U.S. Pat. No. 3,157,806 describes a synchronous electric machine having a stator and a rotor. The stator comprises a stator core structure and stator windings comprising stator coils mechanically supported by the stator core structure. Each of the stator coils comprises electrical conductors and a cooling channel for conducting cooling fluid in the longitudinal direction of the electrical conductors. The stator further comprises cooling elements having heat-conductive mechanical contacts with the stator core structure and comprising channels for conducting the cooling fluid.

Publication US2013285487 describes a stator of an electric machine with concentrated windings. The windings comprise coils comprising tubular cooling channels for conducting cooling fluid in the longitudinal direction of electrical conductors of the coils.

Publication US2006145548 describes a stator coil module that comprises a coil and a cooling pipe, which are molded using insulating mold. A liquid cooling distribution unit is at an axial end of an electric machine and supplies cooling liquid to the stator coil modules.

Publication US2009261668 describes a cooling element of a stator for use in the outer surface of a liquid-cooled electrical machine.

Publication GB851409 describes an electric machine having water-cooled stator laminations and windings to which liquid is fed via manifolds.

Publication GB893847 describes an electric machine having water-cooled stator windings to which liquid is fed via manifolds at an axial end of the machine.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional.

In accordance with the invention, there is provided a new stator for an electric machine. A stator according to the invention comprises:
- a stator core structure, and
- a stator winding comprising a plurality of stator coils mechanically supported by the stator core structure.

Each of the stator coils comprises electrical conductors and a cooling tube for conducting cooling fluid in the longitudinal direction of the electrical conductors. The stator further comprises cooling elements having heat-conductive mechanical contacts with the stator core structure. The cooling elements comprise channels for conducting the cooling fluid, and the cooling tubes of the stator coils are connected to each other via the cooling elements. The stator core structure comprises cavities extending axially through the stator core structure and containing the cooling elements.

The above-mentioned cooling elements are capable of transferring heat caused by iron losses from the stator core structure to the cooling fluid. Furthermore, the cooling elements act as manifolds for conducting the cooling fluid between the cooling tubes of the stator coils.

In accordance with the invention, there is provided also a new electric machine. An electric machine according to the invention comprises:
- a stator according to the invention, and a rotor rotatably supported with respect to the stator.

An electric machine according to an exemplifying and non-limiting embodiment of the invention is a radial flux inner rotor machine where the cooling elements are placed in axial grooves on the yoke section of the stator core structure and the cooling elements comprise cooling fins on surfaces facing away from the airgap surface of the stator core structure. The rotor may comprise e.g. blower vanes for pushing air or other gas via the airgap and/or via axial cooling channels of the rotor, and the electric machine may comprise mechanical structures for guiding the air or other gas to circulate back to the blower along the surfaces of the cooling elements that comprise the above-mentioned cooling fins. In this exemplifying case, the cooling elements are arranged to cool not only the stator core structure but also the air or other gas that is cooling the rotor.

Exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in conjunction with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1A:
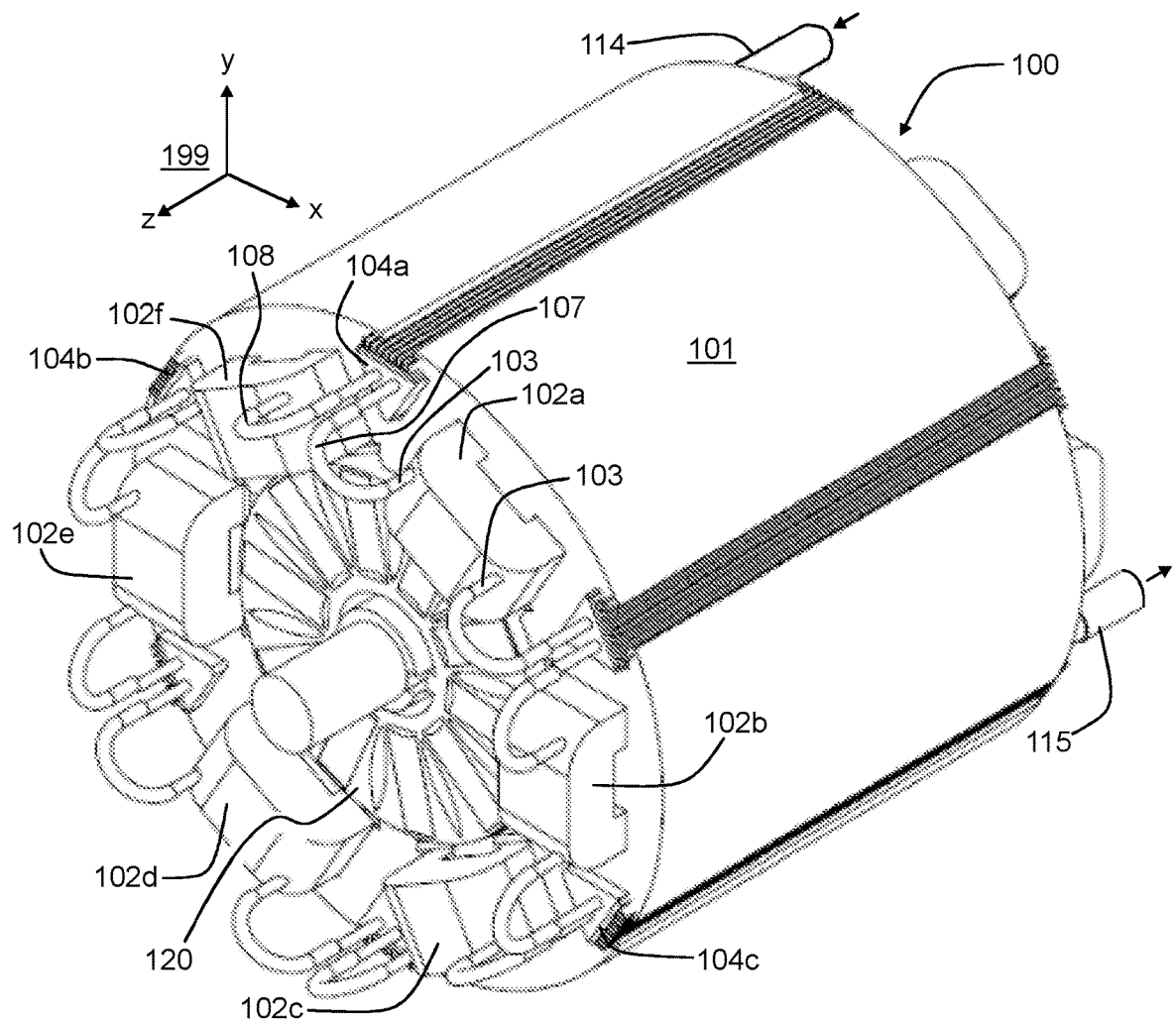
FIGS. 1a and 1b show isometric views of an electric machine according to an exemplifying and non-limiting embodiment of the invention.
Figure 1B:
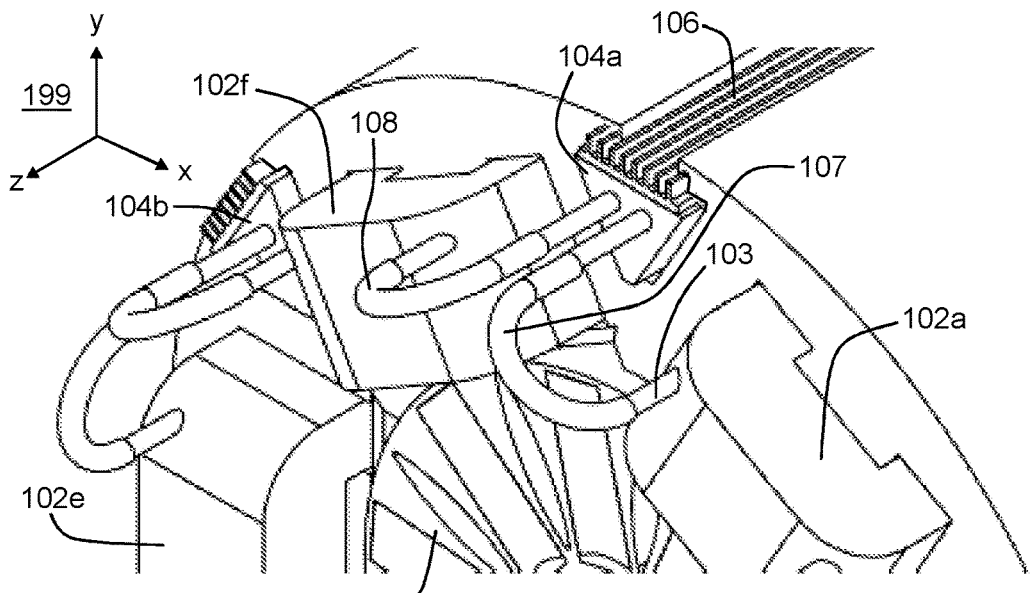
Figure 1C:
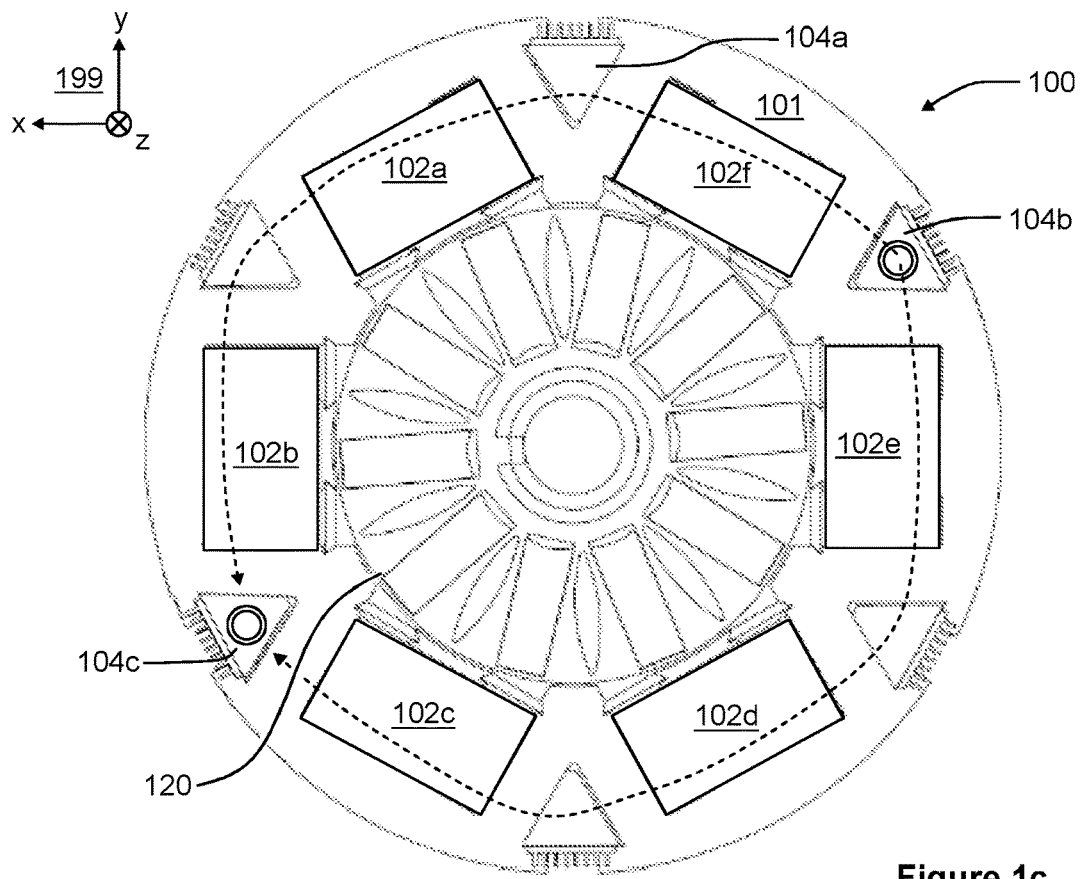
FIGS. 1c and 1d show end-views of the electric machine illustrated in FIGS. 1a and 1b, FIGS. 1e and 1f illustrate cooling elements of the electric machine illustrated in FIGS. 1a-1d.
Figure 1D:
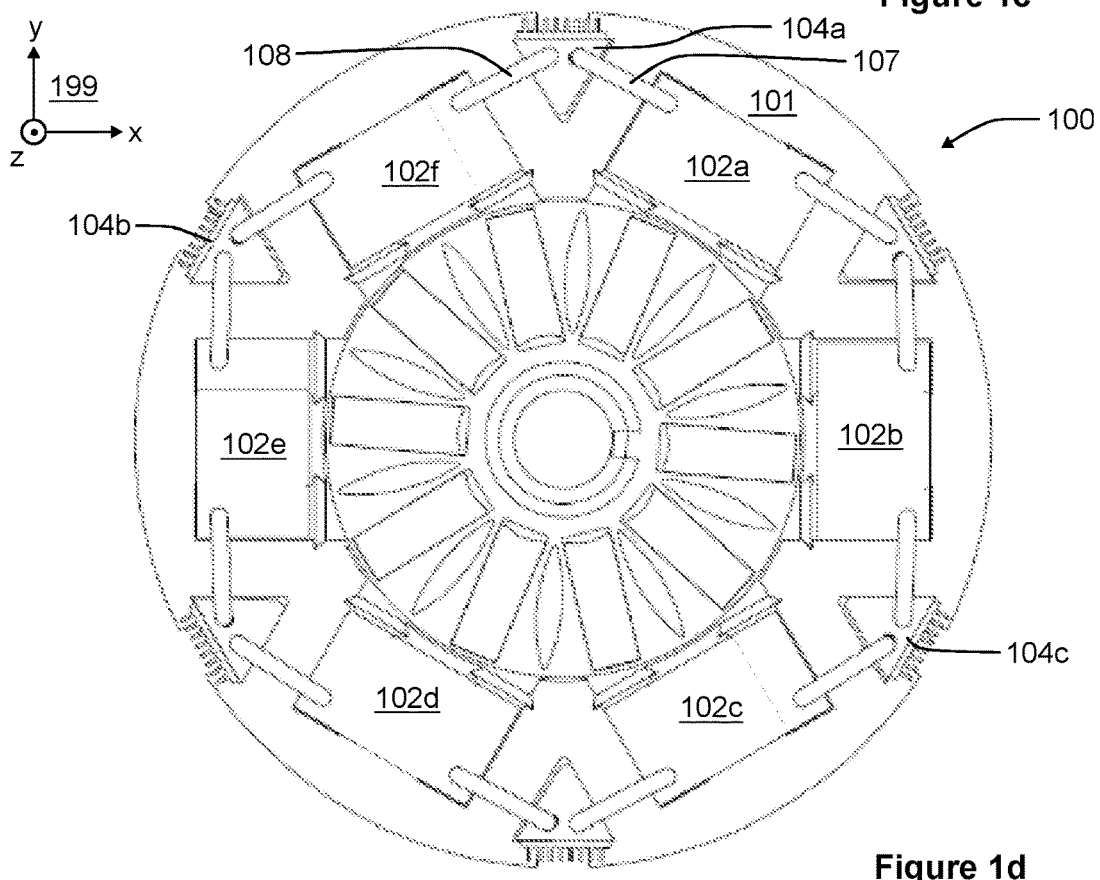

FIGS. 1a and 1b show isometric views of an electric machine according to an exemplifying and non-limiting embodiment of the invention. FIGS. 1c and 1d show end-views of the electric machine. The viewing directions related to FIGS. 1a-1d are illustrated with a coordinate system 199. The electric machine comprises a stator 100 according to an exemplifying and non-limiting embodiment of the invention and a rotor 120 that is rotatably supported with respect to the stator 100. The rotational axis of the rotor 120 is parallel with the z-axis of the coordinate system 199. Bearing arrangements for rotatably supporting the rotor 120 are not shown in FIGS. 1a-1d. The stator 100 comprises a ferromagnetic core structure 101 made of, or at least comprising, ferromagnetic material. The ferromagnetic core structure 101 may comprise e.g. a stack of ferromagnetic sheets that are electrically insulated from each other and stacked in the axial direction of the electric machine, i.e. in the z-direction of the coordinate system 199.

The stator 100 comprises a stator winding that comprises stator coils 102a, 102b, 102c, 102d, 102e, and 102f that are mechanically supported by the stator core structure 101. Each of the stator coils 102a-102f comprises electrical conductors and a cooling tube for conducting cooling fluid in the longitudinal direction of the electrical conductors. In FIGS. 1a and 1b, the cooling tube of the stator coil 102a is denoted with a reference 103. Each stator coil may comprise for example a suitable number of turns of an elongated conductor element that is constituted by the cooling tube and a bundle of electrically conductive wires arranged to surround the cooling tube e.g. so that the cross-section of the cooling tube is substantially in the center of the cross-section of the elongated conductor element. FIG. 1h shows a schematic cross-section of an elongated conductor element 119 of the kind mentioned above. The bundle of the electrically conductive wires is denoted with a reference 116. The bundle may comprise for example 100-200 copper strands. In an exemplifying case, the bundle is composed of Litz-wires. In this exemplifying case, each wire of the bundle is itself a bundle of thin filaments that are twisted or woven. In cases where the supply frequency of an electric machine is low, an elongated conductor element constituting a stator coil may comprise one or more conductor bars instead of a bundle of electrically conductive wires. It is also possible that each stator coil comprises one or more turns of a cooling tube and a different number of turns of electrical conductor so that the cooling tube is amongst the turns of the electrical conductor. The cooling tubes of the stator coils can be made of for example steel, e.g. stainless steel.

The stator 100 comprises cooling elements having heat-conductive mechanical contacts with the stator core structure 101. In FIGS. 1a, 1c, and 1d, three of the cooling elements are denoted with references 104a, 104b, and 104c. The cooling elements comprise channels for conducting the cooling fluid, and the cooling tubes of the stator coils 102a-102f are connected to each other via the cooling elements. Therefore, the cooling fluid is arranged to flow via both the cooling elements and the cooling tubes of the stator coils 102a-102f. Thus, the cooling elements are capable of transferring heat caused by iron losses from the stator core structure 101 to the cooling fluid. Furthermore, the cooling elements act as manifolds for conducting the cooling fluid between the cooling tubes of the stator coils 102a-102f. It is also possible that each stator coil comprises two or more cooling tubes amongst the electrical conductors. In this exemplifying case, each stator coil comprises four or more tube-ends that are connected to the cooling elements. The cooling elements can be made of for example aluminum, copper, or some other suitable material having high thermal conductivity. The exemplifying stator illustrated in FIGS. 1a-1d comprises connection tubes arranged to connect the cooling elements to the cooling tubes of the stator coils 102a-102f. In FIGS. 1a, 1b, and 1d, two of the connection tubes are denoted with references 107 and 108. The connection tubes are advantageously electrically non-conductive, and the connection tubes can be made of for example polymer.

Figure 2:
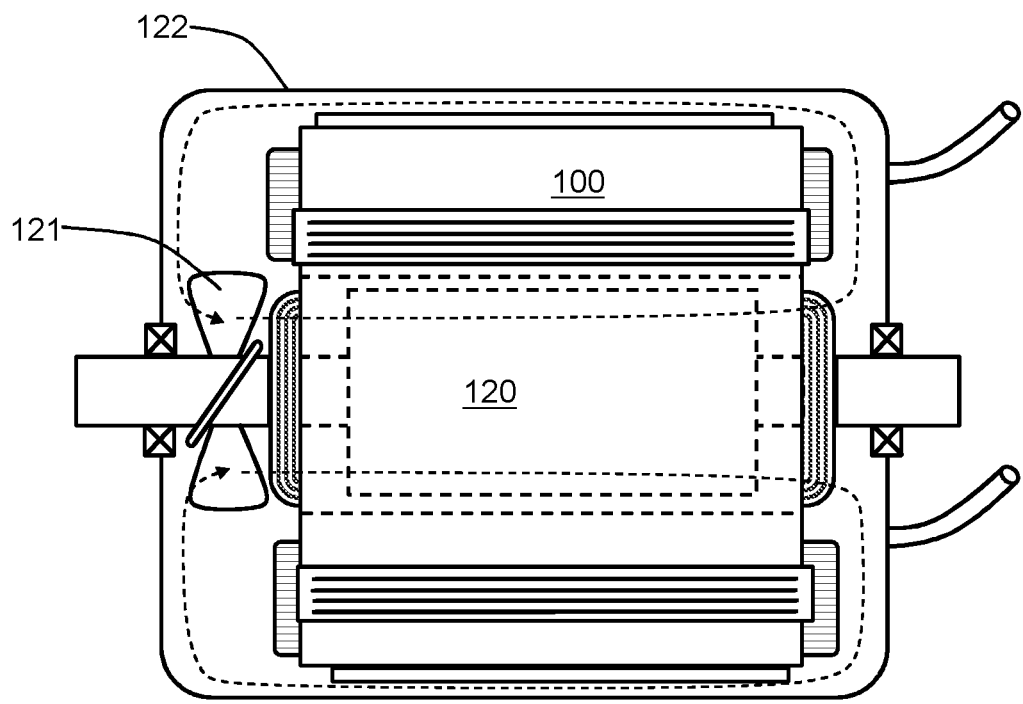
FIG. 2 shows a schematic illustration of an electric machine according to an exemplifying and non-limiting embodiment of the invention.

In the exemplifying stator 100 illustrated in FIGS. 1a-1d, the stator core structure 101 comprises cavities which extend axially through the stator core structure 101 and which contain the cooling elements. It is, however, also possible that the cooling elements are flat-shaped elements attached on the surface of the yoke section of the stator core structure 101. In the exemplifying case illustrated in FIGS. 1a-1d, the cavities for the cooling elements are axial grooves on the yoke section. In this exemplifying case, the cooling elements can be provided with cooling fins on surfaces which are not against the stator core structure 101 i.e. which are facing away from the airgap surface of the stator core structure 101. In FIG. 1b, the cooling fins of the cooling element 104a are denoted with a reference 106. The rotor 120 can be provided with blower vanes for pushing air or other gas via the airgap and/or via axial cooling channels of the rotor 120 i.e. to push the air or other gas through the stator bore. Furthermore, the electric machine can be provided with mechanical structures which guide the air or other gas to circulate back to the blower along the surfaces of the cooling elements that comprise the above-mentioned cooling fins. In this exemplifying case, the cooling elements are arranged to cool not only the stator core structure 101 but also the air or other gas that is cooling the rotor 120. A schematic illustration of an electric machine of the kind mentioned above is shown in FIG. 2 where the blower is denoted with a reference 121 and the mechanical structures for guiding the air or other gas are denoted with a reference 122.

In the exemplifying stator 100 illustrated in FIGS. 1a-1d, the cooling element 104b comprises a first pipe interface 114 for receiving the cooling fluid from outside the stator and the cooling element 104c comprises a second pipe interface 115 for delivering the cooling fluid out from the stator. The pipe interfaces 114 and 115 can be connected to an external system for circulating the cooling fluid. It is however also possible that the cooling tubes of two of more stator coils are connected to an external system for circulating the cooling fluid. A suitable amount of parallel cooling paths can be arranged to keep the cooling system pressure-drop on an acceptable level. In the exemplifying stator 100 illustrated in FIGS. 1a-1d, there are two parallel cooling paths which are denoted with dashed lines in FIG. 1c.

Figure 1E:
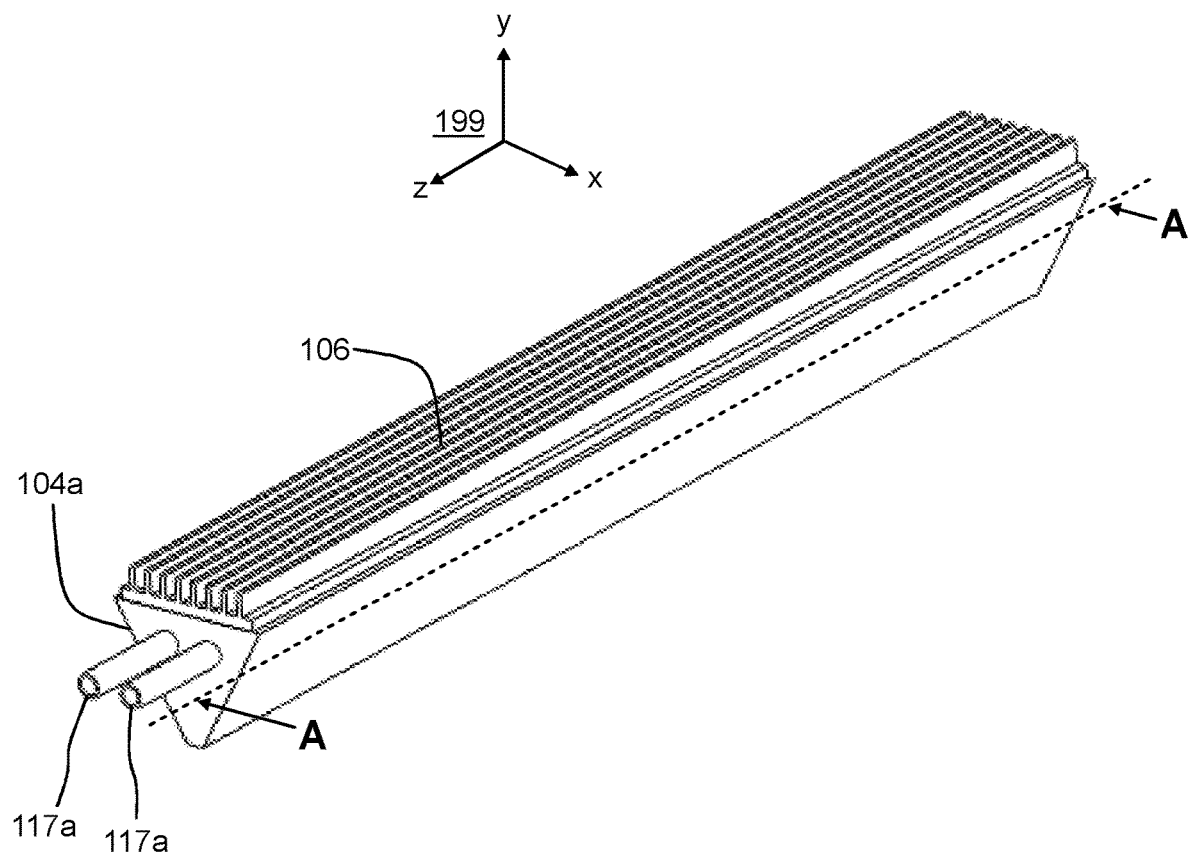
FIG. 1g shows a cross-section of the electric machine illustrated in FIGS. 1a-1d and depicts an exemplifying magnetic flux acting on the electric machine.
FIG. 1h shows a cross-section of an elongated conductor element constituting a stator coil of the electric machine illustrated in FIGS. 1a-1d.
Figure 1E:
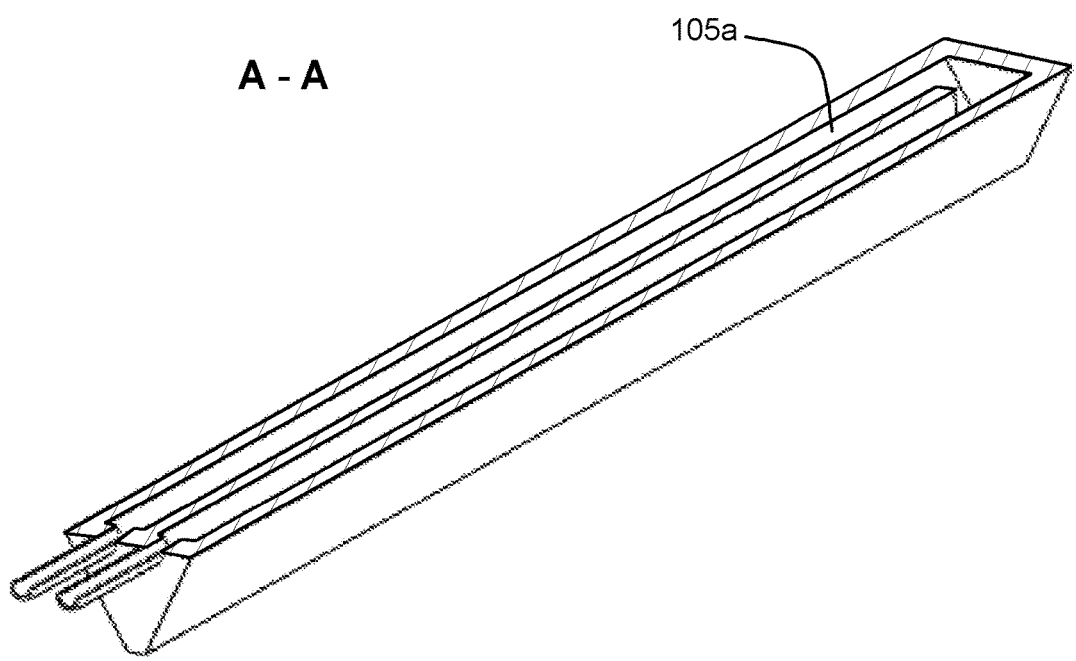
Figure 1F:
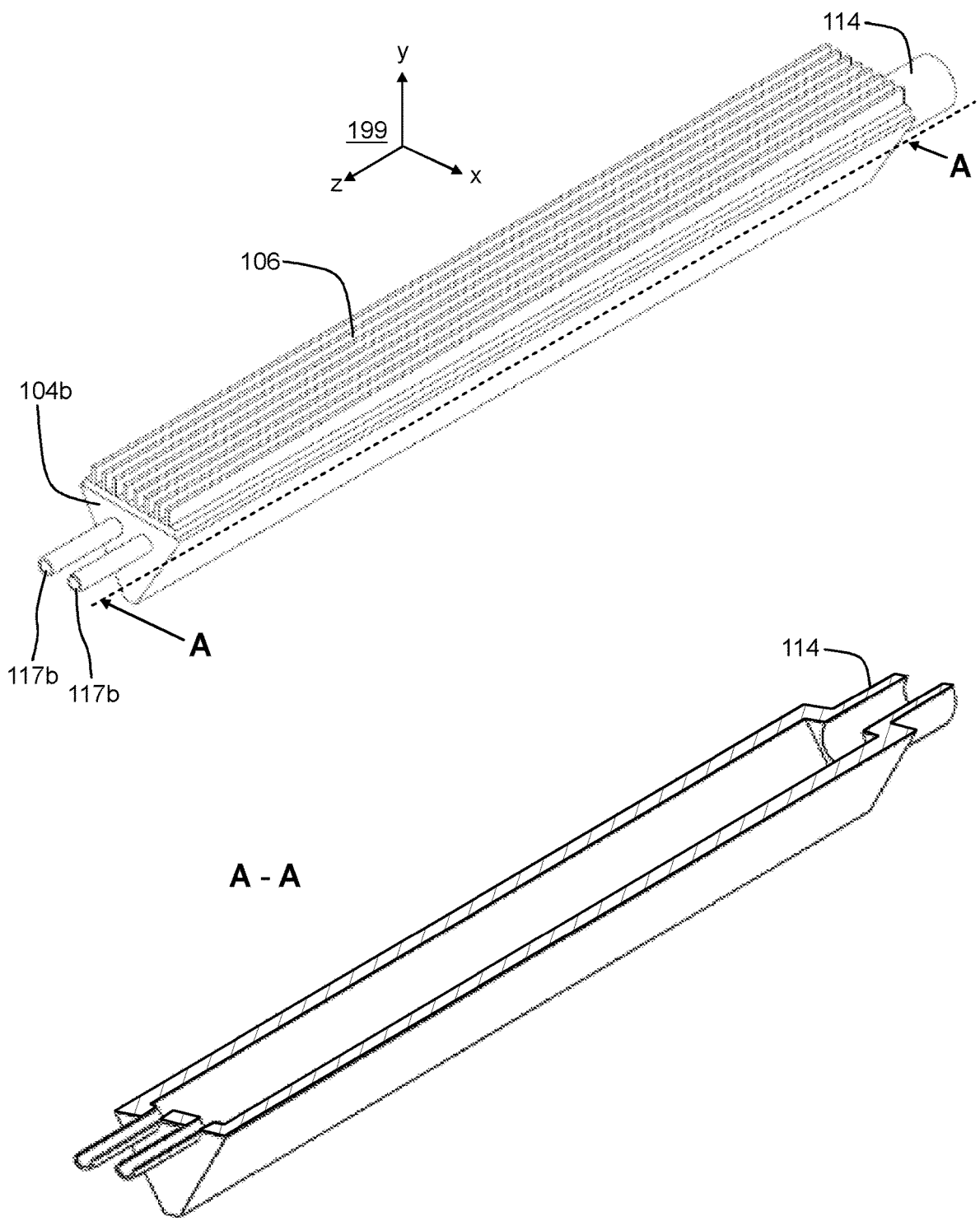

The cooling element 104a is illustrated in FIG. 1e, and the cooling element 104b is illustrated in FIG. 1f. FIG. 1e shows also a section view of the cooling element 104a. Correspondingly, FIG. 1f shows a section view of the cooling element 104b. The sections are taken along a line A-A shown in FIGS. 1e and 1f, and the section plane is parallel with the xz-plane of the coordinate system 199. The cooling element 104a illustrated in FIG. 1e comprises pipe interfaces 117a for connecting to the cooling tubes of the stator coils 102a and 102f via the connection tubes 107 and 108 as shown in FIGS. 1a, 1b, and 1d. Correspondingly, the cooling element 104b illustrated in FIG. 1f comprises pipe interfaces 117b for connecting to the cooling tubes of the stator coils 102e and 102f via the respective connection tubes as shown in FIGS. 1a and 1d. As shown by the section view presented in FIG. 1e, the cooling element 104a comprises a channel 105a that is shaped to conduct the cooling fluid axially from a first end of the stator core structure 101 to a second end of the stator core structure and back from the second end to the first end. Cooling elements of stators according to different embodiments of the invention may comprise channels that can be meandering and/or twisted in many ways.

Figure 1G:
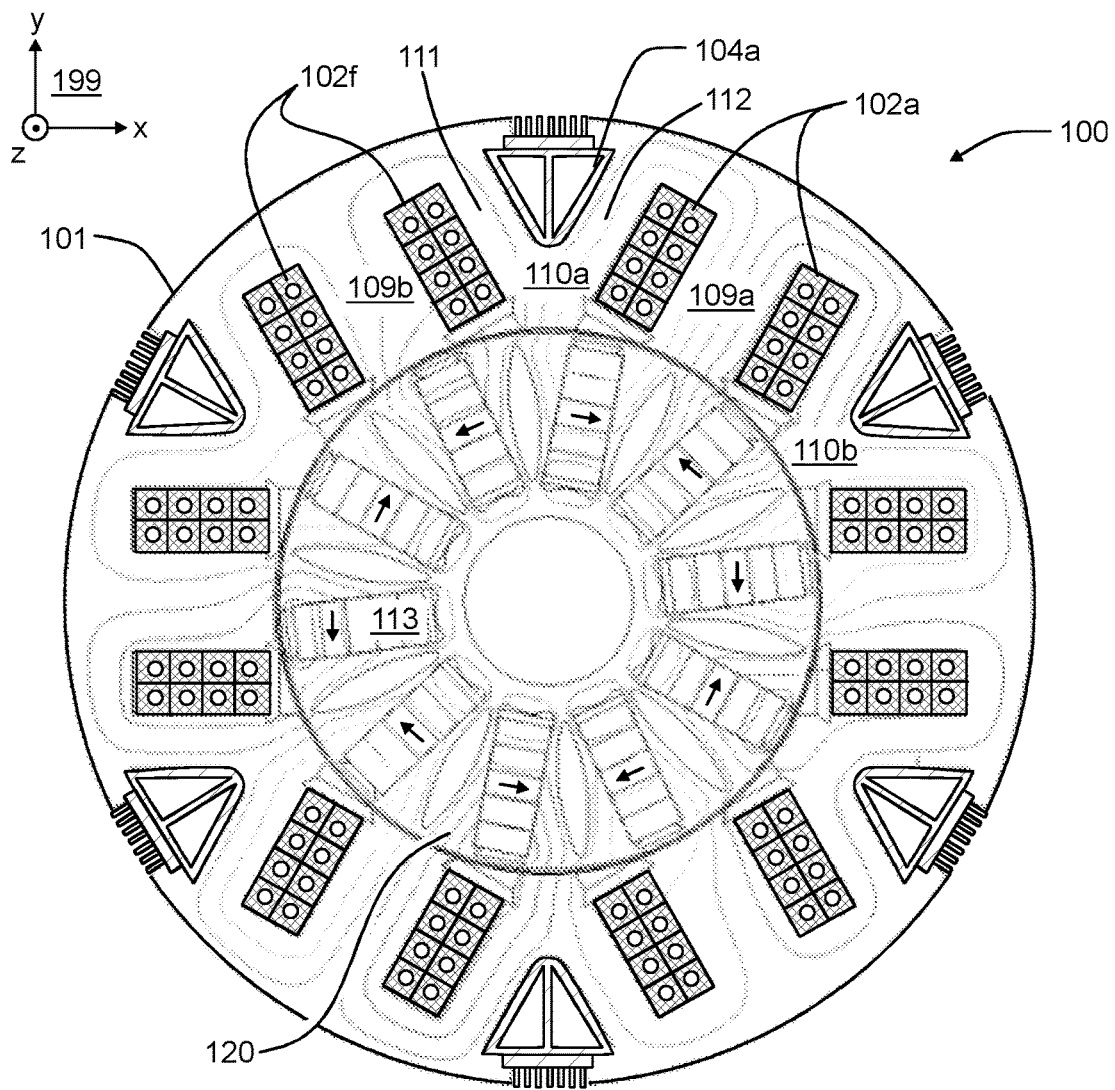
Figure 1H:
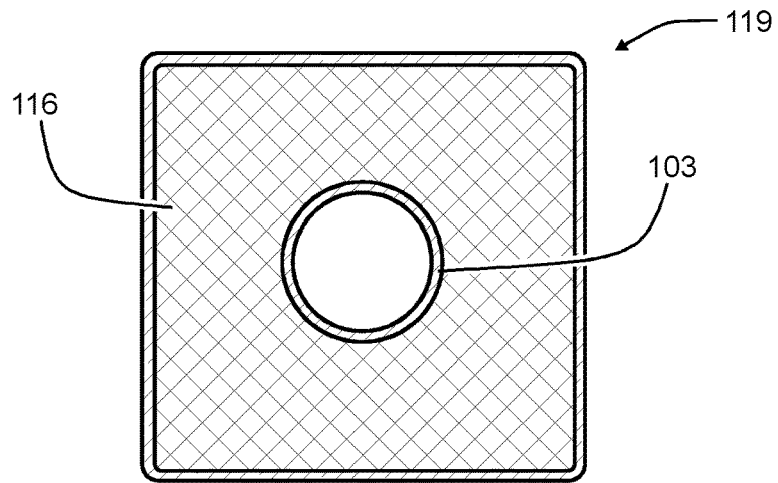

FIG. 1g shows a cross-section of the electric machine illustrated in FIGS. 1a-1d. The section plane is perpendicular to the axial direction of the electric machine. Furthermore, FIG. 1g depicts an exemplifying magnetic flux acting on the electric machine. In the exemplifying stator 100 illustrated in FIGS. 1a-1d and 1g, the stator core structure 101 comprises a plurality of stator teeth and a plurality of stator slots containing the coil-sides of the stator coils 102a-102f. It is however also possible to use the above-described cooling arrangement in an electric machine that has an airgap winding.

In the exemplifying case illustrated in FIGS. 1a-1d and 1g, the stator winding is a concentrated non-overlapping tooth-coil winding where the width of each stator coil is such that each stator coil surrounds one and only one of the stator teeth. The stator teeth are advantageously shaped to allow each stator coil to be installed by pushing the stator coil to surround the respective one of the stator teeth without changing the shape of the stator coil. It is however also possible to use the above-described cooling arrangement in an electric machine that has a non-concentrated stator winding where the number of slots per phase per pole is more than one.

In the exemplifying case illustrated in FIGS. 1a-1d and 1g, the stator teeth comprise first stator teeth each being surrounded by one of the stator coils and second stator teeth each being between adjacent ones of the stator coils. In FIG. 1g, two of the first stator teeth are denoted with references 109a and 109b and two of the second stator teeth are denoted with references 110a and 110b. As shown in FIG. 1g, the cooling elements are located at least partly inside the second stator teeth and each of the second stator teeth has two branches on both sides of the corresponding cooling element. In FIG. 1g, the two branches of the stator teeth 110a are denoted with references 111 and 112. The cooling elements have cross-sections tapering towards the airgap surface of the stator core structure 101. The mechanical arrangement illustrated in FIG. 1g makes it possible that the cooling elements can extend, in the radial direction, towards the airgap surface without substantially disturbing the magnetic flux since the branches of the second stator teeth provide paths via which the magnetic flux can pass the cooling elements.

The exemplifying electric machine described above with reference to FIGS. 1a-1h is a permanent magnet machine. The rotor 120 comprises permanent magnets for producing an excitation magnetic flux. In FIG. 1g, one of the permanent magnets is denoted with a reference 113. In this exemplifying case, each permanent magnet is composed of pieces of permanent magnet material. The magnetization directions of the permanent magnets are depicted with arrows in FIG. 1g. It is to be noted that an electric machine according to an embodiment of the invention can be as well for example an induction machine, a synchronous reluctance machine, a switched reluctance machine, a slip-ring asynchronous machine, or an electrically excited synchronous machine.

The exemplifying electric machine described above with reference to FIGS. 1a-1h is a radial flux inner rotor electric machine. It is to be noted that an electric machine according to an embodiment of the invention can be as well for example a radial flux outer rotor electric machine or an axial flux electric machine.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A stator of an electric machine, the stator comprising:
   a stator core structure;
   a stator winding comprising a plurality of stator coils mechanically supported by the stator core structure, each of the stator coils comprising electrical conductors and a cooling tube surrounded by the electrical conductors and configured to conduct cooling fluid in a longitudinal direction of the electrical conductors; and
   cooling elements having heat-conductive mechanical contacts with the stator core structure, the cooling elements comprising channels configured to conduct the cooling fluid and the cooling tubes of the stator coils being connected to each other via the cooling elements, one of the cooling elements comprising
      a first pipe interface configured to receive the cooling fluid, and
      a plurality of connector pipe interfaces connected to the cooling tubes of two of the stator coils,
   another one of the cooling elements comprising
      a second pipe interface configured to deliver the cooling fluid out from the stator, and
      a plurality of other connector pipe interfaces connected to the cooling tubes of two of the stator coils.

2. The stator according to claim 1, wherein the stator is a stator of a radial flux electric machine.

3. The stator according to claim 2, wherein the stator core structure comprises cavities extending axially through the stator core structure and containing the cooling elements.

4. The stator according to claim 3, wherein the cavities are axial grooves on a yoke section of the stator core structure and the cooling elements comprise cooling fins on surfaces facing away from an airgap surface of the stator core structure.

5. The stator according to claim 2, wherein the channel of one or more of the cooling elements is shaped to conduct the cooling fluid axially from a first end of the stator core structure to a second end of the stator core structure and back from the second end of the stator core structure to the first end of the stator core structure.

6. The stator according to claim 1, wherein the stator core structure comprises a plurality of stator teeth and a plurality of stator slots containing coil-sides of the stator coils.

7. The stator according to claim 6, wherein each of the stator coils surrounds one and only one of the stator teeth.

8. The stator according to claim 7, wherein the stator teeth are configured to allow each of the stator coils to be installed by pushing the stator coil to surround the respective one of the stator teeth without changing a shape of the stator coil.

9. The stator according to claim 7, wherein the stator teeth comprise first stator teeth each being surrounded by one of the stator coils and second stator teeth each being between adjacent ones of the stator coils, and the stator core structure comprises cavities extending axially through the stator core structure and containing the cooling elements so that the cooling elements are located at least partly inside the second stator teeth and each of the second stator teeth has two branches on both sides of the corresponding cooling element.

10. The stator according to claim 9, wherein the cooling elements have cross-sections tapering towards an airgap surface of the stator core structure, the cross-sections being taken along a geometric plane perpendicular to an axial direction of the stator.

11. The stator according to claim 1, wherein each of the stator coils comprises an elongated conductor element constituted by the cooling tube of the stator coil and a bundle of electrically conductive wires arranged to surround the cooling tube.

12. The stator according to claim 1, wherein the cooling tubes of the stator coils are made of stainless steel.

13. The stator according to claim 1, wherein the cooling elements are made of one of the following: aluminum, copper.

14. The stator according to claim 1, further comprising connection tubes connecting the cooling elements to the cooling tubes of the stator coils.

15. The stator according to claim 14, wherein the connection tubes are made of polymer.

16. An electric machine comprising a stator and a rotor rotatably supported with respect to the stator, the stator comprising:
   a stator core structure;
   a stator winding comprising a plurality of stator coils mechanically supported by the stator core structure, each of the stator coils comprising electrical conductors and a cooling tube surrounded by the electrical conductors and configured to conduct cooling fluid in a longitudinal direction of the electrical conductors; and
   cooling elements having heat-conductive mechanical contacts with the stator core structure, the cooling elements comprising channels configured to conduct the cooling fluid and the cooling tubes of the stator coils being connected to each other via the cooling elements, one of the cooling elements comprising
      a first pipe interface configured to receive the cooling fluid, and
      a plurality of connector pipe interfaces connected to the cooling tubes of two of the stator coils,
   another one of the cooling elements comprising
      a second pipe interface configured to deliver the cooling fluid out from the stator, and
      a plurality of other connector pipe interfaces connected to the cooling tubes of two of the stator coils.

17. The electric machine according to claim 16, wherein:
   the electric machine is a radial flux inner rotor machine,
   the cooling elements of the stator are placed in axial grooves on a yoke section of the stator core structure,
   the cooling elements comprise cooling fins on surfaces facing away from an airgap surface of the stator core structure,
   the rotor comprises a blower configured to push gas through a stator bore, and
   the electric machine comprises mechanical structures for guiding the gas to circulate back to the blower along the surfaces of the cooling elements that comprise the cooling fins.

* * * * *